United States Patent [19]
Yokoyama et al.

[11] Patent Number: 4,650,843
[45] Date of Patent: Mar. 17, 1987

[54] SOFT CONTACT LENS

[76] Inventors: Yuuichi Yokoyama, 1-3-10 Higashi, Kunitachi-shi, Tokyo; Eiichi Masuhara, 113 Honkomagome 2-5-10, Bunkyo-ku, Tokyo; Yoshinori Kadoma, 1-4-2-504 Inage Kaigan, Chiba-shi, Chiba; Niro Tarumi, 2-6,21-510 Tutujigaska, Akisima-shi, Tokyo; Makoto Tsuchiya, 1-131-1,, Seki-machi, Nerima-ku, Tokyo, all of Japan

[21] Appl. No.: 687,501

[22] Filed: Jan. 2, 1985

Related U.S. Application Data

[63] Continuation of Ser. No. 411,091, Aug. 24, 1982, abandoned.

[51] Int. Cl.$^4$ .................. C08F 214/18; G02C 7/04
[52] U.S. Cl. ................. 526/245; 351/160 R; 351/160 H
[58] Field of Search ............ 526/245; 351/160 R, 351/160 H

[56] References Cited

U.S. PATENT DOCUMENTS

| | | | |
|---|---|---|---|
| 3,542,461 | 11/1970 | Girard et al. | 526/245 |
| 3,808,179 | 4/1974 | Gaylord | 526/245 |
| 3,950,315 | 4/1976 | Cleaver | 526/245 |
| 4,130,706 | 12/1978 | Plambeck | 526/245 |
| 4,327,202 | 4/1982 | Foley | 526/245 |

*Primary Examiner*—Harry Wong, Jr.

[57] ABSTRACT

When trifluoroethyl methacrylate, hexafluoroisopropyl methacrylate, pentafluoro-n-propyl methacrylate and/or pentafluoro-n-butyl methacrylate which are fluorine-containing monomers, are added to a conventional monomer mixture for producing a soft contact lens, the resulting soft contact lens has the same optical properties and elasticity as conventional soft contact lenses have, and is very superior to the conventional ones in resistance to deposit and in shape stability.

5 Claims, No Drawings

SOFT CONTACT LENS

This is a continuation of application Ser. No. 411,091, filed Aug. 24, 1982, and now abandoned.

This invention relates to a soft contact lens. More particularly, it relates to a soft contact lens which is prepared from a monomer mixture containing a fluorine containing monomer and is resistant to deposits made by tears or the like. Further, it relates to a soft contact lens having excellent mechanical strength and elasticity, and can sufficiently stably retain its lens shape even when processed into a thin lens.

In recent years, soft contact lenses (hereinafter abbreviated as "soft lenses") have come to be widely used in place of conventional hard contact lenses because of their comfort to the wearer. Most soft lenses are composed mainly of 2-hydroxyethyl methcarylate (HEMA) or N-vinylpyrrolidone (NVP), and have a water content of as a wide range as from about 20 to 85%. Soft lenses vary in physical properties such as mechanical strength, refractive index, oxygen permeability, specific gravity and the like depending on the water content of the materials. In general, with increase in the water content, the oxygen permeability increases, but the mechanical strength decreases. Further the refractive index and the specific gravity decrease and approach the value of water.

Since the materials for soft lenses are high in affinity for tears, the surfaces of the lenses are well wetted. Consequently, while soft lenses are used, resistance to soft lenses on the epithelium of a cornea and on the inner surface of an eyelid is reduced, so wearers of soft lenses are relived of uncomfortableness due to the lenses as foreign bodies. Further, soft lenses permit, to a certain extent, the supply of oxygen to a cornea epithelium through their own materials, and hence have a function of relieving want of oxygen in a cornea to some degree.

Increase in the water content of soft lenses leads to improvement of the wettability and oxygen permeability through the lenses, but results in lowering of the mechanical strength of the materials, so that the lenses get easier to break while handled. As another method for supplying more oxygen to a cornea, there is a method by which soft lenses are made thinner. This method is advantageous in that wearers of soft lenses are relieved of uncomfortableness due to the lenses as foreign bodies. However, according to this method, the front side and the back side of the lenses are difficult to be distinguished from each other when the lenses are handled, and when the lenses are stacked together both halves may adhere to each other when the lenses are handled, so that the lenses are very inconvenient to handle before being attached to the eyes.

As a general problem in soft lenses, there is a problem of contamination on the lenses. Contamination on soft lenses are due to the adhesion of proteins, lipids, mucoids and the like in tears; the denaturation, precipitation and adhesion thereof by boiling; and the adhesion of proteins, lipids and the like from fingers during handling of the lenses. The lenses stained therewith show white turbidity, color change to yellow and the like. Further, when the precipitated and adhered matters form a deposit layer, the layer of these matters is cracked, so that the surface of the lenses becomes uneven. Consequently, the surface of the lenses becomes water-repellent and is lowered in oxygen permeability, so that the comfortableness to wearing is deteriorated. Further, the formation of said deposit layer facilitates propagation of fungi, bacteria and the like. When soft lenses are seriously deposited, the effect of improving visual acuity by the lenses is greatly lessened and the uncomfortableness due to the lenses as foreign bodies becomes very serious. The lenses sometimes become unusable. Further, the lenses sometimes cause cornea disease of their wearers and hence contamination is a serious problem in soft lenses. As one mode of the employment of a soft lens, there is sometimes made an attempt to continuously wear a soft lens having a high water content in a patient after cataract operation. However, in this case, since a material having a high water content is used, a tear composition is apt to penetrate into the material, and the lens is liable to be contaminated because it cannot be washed everyday, which causes shortening of life of the lens.

When contamination of soft lenses are caused by a tear composition, the contamination of the lenses vary depending upon the difference in composition of tears among wearers, but, in general, there is strong suspicion of the origin against proteins, particularly lysozyme present in tears. Further, mucoids, lipids and the like appear to adhere to the lysozymes complexly.

As a treatment for contaimination on soft lenses, there are now used a washing treatment with a cleaner and a treatment with an enzymatic agent, however, in a sense, these are only passive countermeasures for removing deposit. Further, these treatments sometimes causes deposit on the lenses when the subsequent washing is insufficient.

In consideration of these facts, the present inventors have devoted themselves to studies to succeed in imparting deposit resistance to a material itself for a soft lens without deteriorating its physical properties, and to find that a soft lens obtained by using said material retains its lens shape sufficiently even when its thickness is small, and is convenient for handling, whereby this invention has been accomplished.

That is to say, an object of this invention is to provide a soft lens to which proteins, lipids, mucoids and the like from tears and the like hardly adhere.

Another object of this invention is to provide a soft lens which retains its lens shape sufficiently even when its thickness is small.

The soft lens of this invention is obtained by subjecting, to casting polymerization, a composition comprising 50 to 95% by weight of a monomethacrylate of an alkylene glycol, 5 to 35% by weight of a fluorine containing monomer selected from the group consisting of trifluoroethyl methacrylate (hereinafter abbreviated as "TFEM"), hexafluoroisopropyl methacrylate ("HFIPM") pentafluoro-n-propyl methacrylate ("PFNPM") and pentafluoro-n-butyl methacrylate ("PFNBM"), and less than 40% by weight of one or more compounds selected from the group consisting of an unsaturated carboxylic acid having one or more carboxyl groups in the molecule, a monomethacrylate of a polyhydric alcohol having three or more hydroxyl groups, and an alkyl methacrylate. Above mentioned percent value of each essential component is calculated on the basis of the weights of the three essential components. The sum of percent values of the three essential components totals 100%. The above mentioned casting polymerization is carried out preferably by a continuous temperature raising method and/or a stepwise temperature raising method. The preferable temperature is from 35° to 110° C.

Since at least one fluorine-containing monomer such as TFEM, HFIPM, PFNPM and PFNBM, is used in the soft lens of this invention, foreign matters adhere hardly to the surface of the soft lens, so that the soft lens is greatly reduced in color change to yellow and in white turbidity as compared with conventional soft lenses. Further, the lens can sufficiently retain its normal lens shape even when processed so as to be thined, which is also a new property obtained by the addition of at least one fluorine-containing monomer such as TFEM, HFIPM, PFNPM and PFNBM.

The production of a soft lens by use of a fluorine-containing acrylic or methacrylic ester has conventionally been known (Louis Plambeck, Jr.; U.S. Pat. No. 4,130,706, however this process uses a fluorine-containing ester whose ester moiety is a straight chain having 5 or more carbon atoms and uses no fluorine-containing ester whcse ester moiety is short, for example, with less than 5 carbon atoms, such as TFEM, HFIPM, PFNPM and PFNBM used in this invention. It has been confirmed that a hydroxyl group containing monomer and the fluorine-containing monomer used in the above-mentioned patent are poor in miscibility with each other and give only an opaque polymer by usual bulk polymerization, however TFEM, HFIPM, PFNPM and PFNBM used in this invention give a transparent polymer and lens without causing white turbidity and opaqueness, by bulk polymerization with the hydroxyl group containing monomer, which is a novel finding by present inventors. Further, unlike this invention, the above-mentioned patent does not aim at obtaining a deposit-resistant soft lens. When at least one fluorine-containing monomer such as TFEM, HFIPM, PFNPM and PFNBM is used as a copolymer component in this invention, a soft lens good in shape stability, elasticity and mechanical strength can be obtained even when the thickness of the lens is small. Therefore, there could be obtained an ideal soft lens which advantageously supplies oxygen to the cornea of a lenswearer and gives only slight uncomfortableness due to the lens as a foreign bodies.

It has become clear that as compared with conventional soft lenses containing no fluorine, the soft lens of this invention is reduced in deposit with proteins, lipids and mucoids. In particular, deposit with protein was measured by use of lysozyme labeled with $^{125}I$ to find a significant difference in adsorption of the lysozyme between the soft lens containing at least one fluorine-containing monomer of this invention and a soft lens containing no fluorine and having the same water content as that of the soft lens of this invention.

Further, even when the thickness of the lens of this invention was adjusted so as to be one-third of the conventional thickness (about 0.05 mm in central thickness), the lens retained its shape, and such a phenomenon that a piece of lens gets folded into two and sticked was not observed, and the lens gave no inconvenience for handling. This was an unexpected result, and was the discovery of a novel effect brought about by the employment of at least one fluorine-containing monomer.

The fluorine-containing monomer is used in an amount of 5 to 35% by weight. TFEM, HFIPM, PFNPM and PFNBM can be used alone or simultaneously. However, when the added amount of the fluorine-containing monomer is less than 5% by weight, the effect of the monomer on antideposit is insufficient, and with increase of the added amount, the effect on antideposit is heightened, but the elasticity of the resulting soft lens is reduced. When the added amount exceeds 35% by weight, elasticity required of a soft lens becomes unobtainable. Suitably, an amount of 10 to 20% by weight is employed.

The monomethacrylate of an alkylene glycol is monomethacrylate of, for example, ethylene glycol, propylene glycol, diethylene glycol, tetraethylene glycol or a polyethylene glycol, and is the main constituent of the soft lens of this invention. As the monomethacrylate, ethylene glycol monomethacrylate, i.e., 2-hydroxyethyl methcarylate (2-HEMA) is preferably used. Simultaneous use of 2-hydroxyethyl methcarylate and propylene glycol monomethcarylate is also preferred.

Representative examples of the unsaturated carboxylic acids having one or more carboxyl groups in one molecule include acrylic acid, methacrylic acid, itaconic acid and the like, and the unsaturated carboxylic acid is a constituent for increasing the water content by a hydration and swelling treatment involving an alkali treatment and imparting elasticity required for a soft lens. As the unsaturated carboxylic acid, methacrylic acid is particularly preferred.

As the monomethacrylate of a polyhydric alcohol having three or more hydroxyl groups, glyceryl methacrylate or monomethacrylate of pentaerythritol is used, and this constituent contributes to the increase of the water content and the elasticity.

The preferred alkyl methacrylate is methyl, ethyl, n-propyl or n-butyl ester of methacrylic acid, and is a constituent for improving the strength, processability and shape stability of the resulting soft lens.

In addition to these constituents, there may be used, as cross linking agents, polyfunctional monomers such as ethylene glycol dimethacrylate, diethylene glycol dimethacrylate, triethylene glycol dimethacrylate, tetraethylene glycol dimethacrylate, butylene glycol dimethacrylate, neopentyl glycol dimethacrylate, propylene glycol dimethacrylate, diethylene glycol bisallylcarbonate, trimethylolpropane trimethacrylate, bisphenol A dimethacrylate, methylenebisacrylamide, and the like. N-vinylpyrrolidone, acrylamide, methacrylamide or the like may be used as a constituent for increasing the water content.

As the polymerization initiator, there are used conventional radical-generating agents, for example, benzoyl peroxide, lauroyl peroxide, cumene hydroperoxide, di-tert-butyl peroxide, bis-4-tert-butylcyclohexyl peroxydicarbonate, diisopropyl peroxydicarboante, azobisisobutyronitrile, azobisisovaleronitrile and the like, and initiators generating a radical at low temperatures are more preferable.

In a preferred embodiment of this invention, the above-mentioned constituents are mixed and then poured into a mold made of a metal, glass or plastics, after which in such a condition that the resulting mixture is hermetically sealed up, polymerization is completed in an electric furnace by a continuous temperature raising method and/or a stepwise temperature raising method of preferably from 35° to 110° C. After completion of the polymerization, the resulting polymer is taken out of the mold and finished by usual mechanical processing and finishing to give thereto a lens shape. In order to hydrate and swell the finished lens, the lens is immersed in a physiological saline containing sodium carbonate, sodium hydrogencarbonate, potassium hydrogencarbonate, and/or the like, at room temperature or with heating, and then immersed in a physiological salt solution and allowed to stand at room temperature or heated while the physiological salt solution is renewed several times, to be hydrated and swollen.

The thus produced soft lens has the same optical properties and elasticity as those of conventional soft lenses, and has such an effect of the addition of at least one fluorine-containing monomer that it is less susceptible to adhesion of deposit due to proteins, lipids and mucoids than conventional soft lenses. Further, a soft lens retaining a lens shape sufficiently stably could be obtained even when the thickness of the soft lens was small.

This invention is further explained below in more detail referring to Examples and Comparative Examples, which are not by way of limitation but by way of illustration. In Examples and Comparative Examples, parts are by weight.

EXAMPLE 1

To a mixture of 89.7 parts of 2-hydroxyethyl methacrylate, 10 parts of TFEM and 0.3 part of methacrylic acid was added 0.1 part of azobisisobutyronitrile as a polymerization initiator, and the resulting mixture was sufficiently stirred and mixed, poured into a mold made of plastics, and then hermatically sealed up therein. The mixture was then subjected to polymerization in a continuous-temperature-raising furnace of from 35° to 110° C., and the resulting transparent polymer was processed by cutting and polishing to give thereto a lens shape. The thus obtained lens was treated in a physiological saline containing 1.2% of sodium hydrogencarbonate at 80° to 90° C. for 1 hour and then in a physiological salt solution at 80° to 90° C. for 1 hour, whereby the lens was allowed to absorb water and swell and at the same time, the unpolymerized monomer was eluted from the lens. The thus obtained soft lens had a water content of 35% and a tensile strength of about 850 g/mm$^2$, was comfortable to wearing, and, as shown in Table 1, adsorbed only very small amount of protein (lysozyme) as compared with a conventional soft lens having the same water content, though it was equal in optical properties to the conventional soft lens. Further, the soft lens, even when its thickness was made smaller, had the same shape stability as did those having a conventional thickness.

EXAMPLE 2

To a mixture of 84 parts of 2-hydroxyethyl methacrylate, 15 parts of TFEM and 1 part of methacrylic acid was added 0.1 part of diisopropyl peroxydicarbonate, and the same procedure as described in Example 1 was followed to obtain a soft lens having a water content of 36%. As shown in Table 1, this lens adsorbed only very small amount of the protein as compared with the conventional soft lens having the same water content and containing no fluorine compound.

EXAMPLE 3

To a mixture of 70 parts of 2 hydroxyethyl methacrylate, 10 parts of TFEM and 20 parts of glyceryl methacrylate was added 0.1 part of bis-4-tert-butylcyclohexyl peroxydicarbonate, and polymerization and lens processing were carried out in the same manner as in Example 1, after which the thus obtained lens was treated in a physiological salt solution at 80° to 90° C. for 2 hours to produce a soft lens having a water content of 36%. This soft lens had excellent resistance to deposit.

EXAMPLES 4 TO 15

Soft lenses having various compositions and water contents were produced by the same technique as in Examples 1 to 3. All the soft lenses were colorless and transparent, had the same optical properties, mechanical processability and strength as those of conventional soft lenses, and were less susceptible to deposit with proteins. The soft lenses had good shape stability even when they were thin.

COMPARATIVE EXAMPLES 1 TO 4

By the same technique as in Examples 1 to 3, soft lenses were produced from individual polymers having various compositions containing no fluorine-containing monomer, and were used as controls.

Each of the soft lenses obtained in above Examples and Comparative Examples was immersed in a solution of egg white lysozyme labeled with radioactive iodine ($^{125}$I) (concentration 500 μg/ml; pH 7.3; 0.05 M borate buffer), and taken out of the solution after 2.5 hours, 24 hours, 3 days and 10 days, and the lens surface was washed with flowing water. Thereafter, the amount of egg white lysozyme adhered to the lens was measured by a method by which γ-rays were detected by means of a well-type scintillation counter. As shown in Tables 1 to 4, the amounts of lysozyme adhered to the lenses of the comparative examples 1 to 4 containing no fluorine-containing monomer as a copolymer component are taken as 100%, and those in the examples are shown in comparison therewith.

The shape stability is expressed by ⊚, o, Δ or x (explained below) based on the observation of the elasticity, ability to restore the original shape during handling, and shape stability during handling of a thin lens (central thickness: 0.05 mm). The tensile strength is expressed in terms of g/mm$^2$.

⊚ : Greatly excellent shape stability and elasticity
o: Excellent shape stability and elasticity
Δ: A little inferior shape stability and elasticity
x: Inferior shape stability and elasticity

TABLE 1

| Sample | Composition (parts by weight) | Water content | Immersion for 2.5 hs | Immersion for 24 hs | Immersion for 3 days | Immersion for 10 days | Shape stability Tensile strength |
|---|---|---|---|---|---|---|---|
| Comparative Example 1 | HEMA/EDMA (99/1) | 35% | 100% | 100% | 100% | 100% | Δ 250 |
| Example 1 | HEMA/TFEM/MA (89.7/10/0.3) | 35% | 84 | 65 | 57 | 60 | ⊚ 850 |
| Example 2 | HEMA/TFEM/MA (84/15/1) | 36% | 78 | 73 | 79 | 75 | ⊚ 910 |
| Example 3 | HEMA/TFEM/GMA (70/10/20) | 36% | 54 | 51 | 58 | 57 | o |
| Example 4 | HEMA/TFEM/MA/MMA | 40% | 81 | 68 | 83 | 85 | ⊚ |

TABLE 1-continued

| Sample | Composition (parts by weight) | Water content | Absorbed amount ratio Immersion for 2.5 hs | Immersion for 24 hs | Immersion for 3 days | Immersion for 10 days | Shape stability Tensile strength |
|---|---|---|---|---|---|---|---|
| Example 5 | (84/10/1/5) HEMA/TFEM/GMA/MMA (65/10/20/5) | 38% | 67 | 62 | 71 | 68 | 630 o |
| Example 6 | HEMA/HFIPM/MA (94/5/1) | 35% | 72 | 67 | 73 | 59 | ⊚ 840 |
| Example 7 | HEMA/HFIPM/GMA (60/10/30) | 36% | 53 | 48 | 56 | 61 | o — |
| Example 8 | HEMA/TFEM/MA/EDMA (88/10/1/1) | 33% | 70 | 62 | 65 | 71 | ⊚ 950 |

TABLE 2

| Sample | Composition (parts by weight) | Water content | Absorbed amount ratio Immersion for 2.5 hs | Immersion for 24 hs | Immersion for 3 days | Immersion for 10 days | Shape stability Tensile strength |
|---|---|---|---|---|---|---|---|
| Comparative Example 2 | HEMA/MMA/EMA/MA (79/10/10/1) | 40% | 100% | 100% | 100% | 100% | △ 430 |
| Example 4 | HEMA/TFEM/MMA/MA (84/10/5/1) | 40 | 36 | 60 | 56 | 51 | ⊚ 630 |
| Example 9 | HEMA/HFIPM/MMA/MA (73.5/15/10/1.5) | 41 | 32 | 49 | 62 | 47 | ⊚ 650 |
| Example 10 | HEMA/GMA/TFEM (60/30/10) | 42 | 33 | 41 | 53 | 42 | o 370 |

TABLE 3

| Sample | Composition (parts by weight) | Water content | Absorbed amount ratio Immersion for 2.5 hs | Immersion for 24 hs | Immersion for 3 days | Immersion for 10 days | Shape stability Tensile strength |
|---|---|---|---|---|---|---|---|
| Comparative Example 3 | HEMA/MMA/MA (80/15/5) | 60% | 100% | 100% | 100% | 100% | △ 210 |
| Example 11 | HEMA/TFEM/MMA/MA (64.8/20/10/5.2) | 60 | 39 | 48 | 50 | 39 | ⊚ 440 |
| Example 12 | HEMA/TFEM/MA (76/20/4) | 60 | 35 | 46 | 62 | 45 | ⊚ 400 |
| Example 13 | HEMA/HFIPM/MA/MMA (69.7/15/5.3/10) | 60 | 38 | 53 | 61 | 57 | △ — |

TABLE 4

| Sample | Composition (parts by weight) | Water content | Absorbed amount ratio Immersion for 2.5 hs | Immersion for 24 hs | Immersion for 3 days | Immersion for 10 days | Shape stability Tensile strength |
|---|---|---|---|---|---|---|---|
| Comparative Example 4 | HEMA/MA/n-BMA/MMA (77/10/3/10) | 72% | 100% | 100% | 100% | 100% | x 160 |
| Example 14 | HEMA/TFEM/MMA/MA/HPMA/4G (53/20/10/11/5/1) | 72 | 44 | 58 | 71 | 70 | o 300 |
| Example 15 | HEMA/NVP/TFEM/EDMA (70/20/9/1) | 70 | 40 | 51 | 63 | 61 | o 270 |

Abbreviation:
HEMA 2-hydroxyethyl methacrylate
TFEM trifluoroethyl methacrylate
HFIPM hexafluoroisopropyl methacrylate
MA methacrylic acid
GMA glyceryl methacrylate
MMA methyl methacrylate
EDMA ethylene glycol dimethacrylate
EMA ethyl methacrylate
4G tetraethylene glycol dimethacrylate
NVP N—vinylpyrrolidone
HPMA 2-hydroxypropyl methacrylate
n-BMA n-butyl methacrylate

What is claimed is:
1. A soft contact lens obtained by subjecting, to casting polymerization, a composition comprising 50 to 95% by weight of a monomethacrylate of an alkylene glycol selected from the group consisting of ethylene glycol, propylene glycol, diethylene glycol and tetraethylene glycol, 5 to 35% by weight of a fluorine containing monomer selected from the group consisting of trifluoroethyl methacrylate, hexafluoroisopropyl methacrylate, pentafluoro-n-propyl methacrylate and pentafluoro-n-butyl methacrylate, and 0.3 to 40% by weight of one or more compound selected from the group consisting of acrylic acid, methacrylic acid, itaconic acid, glyceryl methacrylate, monomethacrylate of pentaerythritol and an alkyl methacrylate selected from the group consisting of methyl, ethyl, n-proyl and n-butyl esters of methacrylic acid.

2. A soft contact lens according to claim 1 wherein acrylic acid, methacrylic acid or itaconic acid is present in an amount of from 0.3 to 10% by weight.

3. A soft contact lens according to claim 1 wherein glyceryl methacrylate or monomcthacrylate of pentaerythritol is present in an amount of from 20 to 30% by weight.

4. A soft contact lens according to claim 1 wherein an alkyl methacrylate is present in an amount of from 5 to 10% by weight.

5. A soft contact lens according to claim 1 wherein the casting polymerization is performed by raising the temperature from 35° to 110° C. either continuously, stepwise, or both.

* * * * *